United States Patent
Hill

(10) Patent No.: US 6,186,179 B1
(45) Date of Patent: Feb. 13, 2001

(54) DISTURBANCE SIMULATING FLOW PLATE

(75) Inventor: James A. Hill, Haverhill, MA (US)

(73) Assignee: Panametrics, Inc., Waltham, MA (US)

(*) Notice: Under 35 U.S.C. 154(b), the term of this patent shall be extended for 0 days.

(21) Appl. No.: 09/391,276

(22) Filed: Sep. 7, 1999

Related U.S. Application Data

(60) Provisional application No. 60/101,026, filed on Sep. 18, 1998.

(51) Int. Cl.$^7$ ............................... F15D 1/02; B01F 5/06
(52) U.S. Cl. ........................ 138/39; 138/44; 366/340; 73/861.52
(58) Field of Search ......................... 138/39, 40, 44; 366/339, 340; 73/861.52

(56) References Cited

U.S. PATENT DOCUMENTS

| | | | | |
|---|---|---|---|---|
| 3,582,048 | * | 6/1971 | Sarem | 138/38 X |
| 4,786,185 | * | 11/1988 | Knief | 366/340 |
| 5,215,375 | * | 6/1993 | Ditzler et al. | 366/337 |
| 5,341,848 | | 8/1994 | Laws | 138/44 |
| 5,495,872 | | 3/1996 | Gallagher et al. | 138/44 |
| 5,529,093 | | 6/1996 | Gallagher et al. | 138/44 |
| 5,762,107 | * | 6/1998 | Laws | 138/44 |
| 6,042,263 | * | 3/2000 | Mentzer et al. | 366/340 |

* cited by examiner

*Primary Examiner*—Patrick Brinson
(74) *Attorney, Agent, or Firm*—Nutter, McClennen & Fish, LLP

(57) ABSTRACT

A flow conditioning plate for interposition in a flow line has a pattern of apertures which introduces a flow irregularity characteristic of a commonly encountered irregular flow in a plant, such as the disturbance introduced by one or more junctions or fittings in the upstream flow path. The apertures may introduce a specific flow distribution, asymmetry of flow profile or swirl component, and these may be tuned to simulate a plant condition that occurs downstream of one or more bends, elbows or T junctions. The disturbance persists, or evolves in a known way for a well defined distance along the flow path to simulate field flow conditions, and a flow meter is tested or calibrated in the disturbed segment, preferably at a defined position, under known flow to produce a calibration table. The meter may then be later installed to measure the irregular flow in an unconditioned flow line at a plant. This allows a meter factor or multiple weighting algorithm to be quickly ascertained and programmed to adapt a meter to an intended plant having known configuration involving complex or disturbed flow paths and irregular flow conditions, and the method of calibration extends the use of clamp-on metering systems to process measurement needs at many accessible conduits and segments in existing plants that carry unsettled or disturbed flows.

11 Claims, 3 Drawing Sheets

FLOW AT L

FLOW AT L+ΔL

DISTURBANCE SIMULATING FLOW PLATE

CROSS-REFERENCE TO RELATED APPLICATION

This application is related to U.S. Provisional Patent Application Ser. No. 60/101,026, filed Sep. 18, 1998 of which the priority is hereby claimed.

The present invention relates to flow measurement, and particularly to flow measurement systems employing non-mechanical or non-invasive measurement apparatus, such as systems using ultrasonic signals.

A large number of ultrasonic flow meters operate by propagating an ultrasonic signal through the medium, and determining its flow rate from the propagation time of the signal. By suitable choice of signal paths, the flow in the axial direction, the swirl or even the cross-flow may be measured. Such a system can be quite adaptable, and may launch signals into the fluid from transducers which conveniently clamp to the outside of a conduit, without requiring separate mounting holes or other machining of the pipe or vessel. Moreover, ultrasonic measurement units may come pre-equipped with a microprocessor which enables the unit to conveniently set a number of dimensions (such as spacing between transducers), fluid properties (such as composition or molecular weight) and correction constants (such as pipe material and wall thickness) so that they are easily set up to provide accurate measurements for the system to which they are attached under a range of flow and temperature conditions. Such systems may also perform signal conditioning, range gating, and other specialized signal processing, such as Doppler analysis of received signals, to implement different flow measurement protocols.

However, while ultrasonic measuring systems can be quite versatile, they are predicated to some extent on knowing in advance a number of the properties or parameters of the fluid, and on the flow being moderately well behaved. For example, the measurements of a known fluid are often taken in a straight segment of conduit and a fully settled flow profile is assumed. Commonly, a meter or measurement system is assigned a meter factor which is a function, among other things, of the actual fluid flow profile in a given conduit. Since in practice flow is substantially disturbed by junctions along the flow path, measurements are typically taken at a position located far away from the nearest T or elbow, and in a relatively long uninterrupted segment of pipe where flow profile may be assumed to be stationary.

Often it is not possible to locate a suitable segment in an existing flow path, and when a system of this type is designed knowing that a measurement must be taken, it is not uncommon to install flow conditioners to smooth the irregular distribution introduced by a T or elbow, so as to produce a more laminar, or more symmetric flow profile along the length of conduit where measurements are to be taken. However, such flow conditioning devices must be installed in-line, requiring special fitting of pipe segments or internal elements, and this is a relatively cumbersome and expensive procedure. Perhaps the simplest of these hardware approaches to flow conditioning is to install an obstructing device directly in the flow path to impede certain forms of irregular flow and produce a substantially uniform or stationary altered flow that is more readily subject to measurement.

Devices for producing a fully developed or smooth steady state flow under otherwise turbulent or irregular flow profile conditions often include a plurality of axially extending vanes for conditioning the flow by impeding swirl, or a plate with a pattern of apertures to uniformize the flow profile. Examples of such flow conditioners are described in U.S. Pat. No. 5,762,10; U.S. Pat. No. 5,529,093, and elsewhere. When used, for example, in the measurement of natural gas flowing at high speeds and at a very high pressure, such plates may be used to produce a steady state velocity profile and turbulence structure while substantially eliminating swirl of the fluid flowing in the conduit. In other applications, several such plates may be stacked or spaced in sequence one after the other along a flow path to more effectively remove the undesired irregularities introduced by structures along the upstream flow. In such a case, for example, the plate furthest upstream may have holes of different size configured to correct the overall velocity profile toward a condition of greater symmetry, while successive downstream plates may have a more regular pattern of apertures which are intended to counteract swirl without substantially further impeding flow, or to correct a profile imbalance, at least for a short distance where the sendind and receiving transducers are located, without introducing swirl.

In general any such flow conditioning plates must be designed to not erode or create debris in the conduit or downstream, and also will in general be designed, perhaps with extensive trial and error, to function for the particular conduit size, type of fluid, and velocity/pressure ranges involved. Of course, once such a flow conditioning plate is designed, the meter placed downstream may still require further on-site calibration and setting up to operate on the standardized set of conditions produced by the flow plate. Thus the installation of an ultrasonic flow measurement system remains a specialized task.

Accordingly it would be desirable to provide a flow conditioner applicable to a wide range of field installations.

It would further be desirable to provide a flow conditioner in the form of an aperture plate which simplifies meter installation and calibration protocols.

It would also be desirable to design a flow conditioner which creates, rather than corrects, a set of irregular field conditions, and which allows a meter to be set up, tested, or calibrated for these conditions in the factory so that it will accurately meter the flow of an actual plant.

SUMMARY OF THE INVENTION

This is achieved in accordance with the basic aspect of the present invention by providing a flow conditioning plate for interposition in a flow line which has a pattern of apertures effective to introduce a flow irregularity. In different embodiments the irregularity corresponds to the profile and/or swirl introduced by an elbow, T or other junction, or to that introduced by a set of two or more junctions in a standard conduit. The irregularity persists for a well defined distance along the flow path, allowing an ultrasonic meter to be placed downstream and produce measurements under the defined flow irregularity. The meter calibrated in this fashion is then used directly on an actual process flow line having the corresponding actual elbow, T or other junction or junctions upstream of its conduit. By using a flow conditioning plate to create a standard disturbance rather than to smooth the flow the meter may be calibrated in the factory and subsequently sent to the field to be fitted downstream of a junction without further intervention in or conditioning of the flow line for setting up or calibrating the meter.

In addition the simulation studies which are extensively required for the development of a new meter application are greatly simplified, since it is not necessary to install one or more junctions in the piping of an experimental test conduit or flow system. Instead a relatively thin simulator plate, or succession of such plates, are simply clamped between flanges in a straight test section to produce the required flow conditions, and the meter is tested or calibrated while a defined volume of fluid is passed through the test conduit to determine the necessary meter constants of calibration data.

BRIEF DESCRIPTION OF THE DRAWINGS

These and other features of the invention will be understood from the description below taken together with the figures herein wherein.

DETAILED DESCRIPTION

Figure 1:
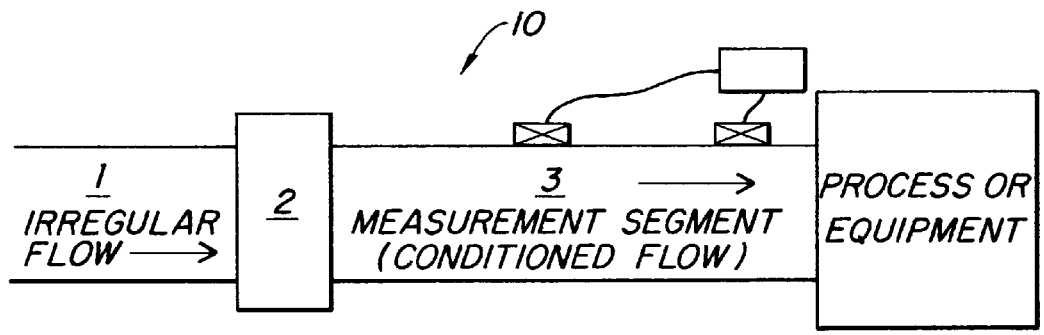
FIG. 1 illustrates a prior art flow conditioning system.

FIG. 1 illustrates the prior art flow conditioning system 10. As shown, an inlet conduit 1 having irregular flow is connected to a flow conditioning segment 2 which interacts with the inlet flow to typically smooth the velocity profile and/or break up or impede patterns of swirl, so that the flow leaving the conditioner 2 enters the downstream conduit 3 with a smooth flow profile suitable for the measurement characteristics of an ultrasonic flow meter 5. The meter is shown schematically as a simple set of clamp-on transducers which perform a transit time signal measurement. The conditioned flow profile, sometimes referred to as a pseudo fully developed flow, remains stable for some distance downstream, allowing a reasonably accurate fluid flow measurement to be made before the material reaches the downstream process or plant equipment 4. As noted above, the flow conditioner 2 may consist of a flow conditioning segment, a number of apertured plates, or other structure mounted in the conduit for suitably smoothing or conditioning the turbulence or irregular flow present at the inlet 1.

Figure 2:
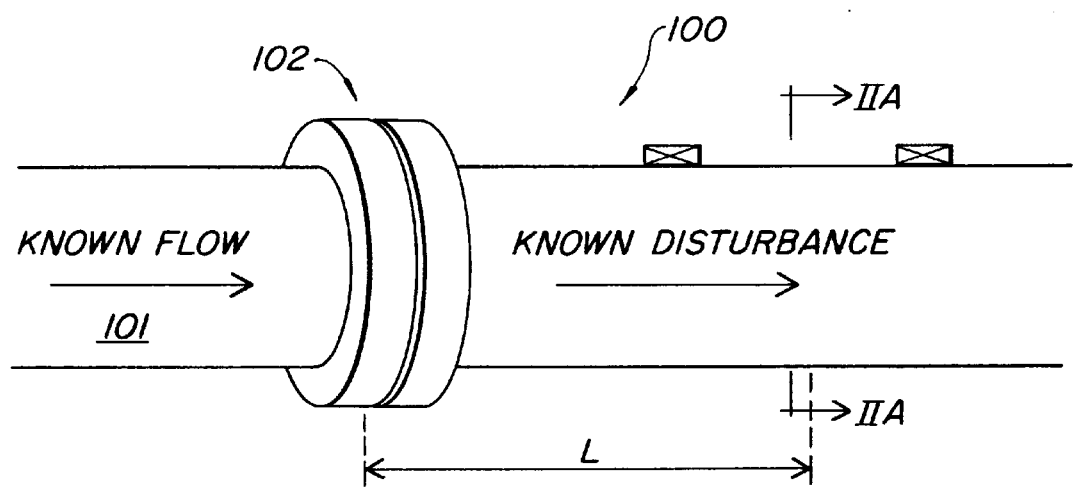
FIG. 2 illustrates a flow conditioning system of the present invention.

FIG. 2 illustrates a system in accordance with the present invention. The invention will be illustrated and discussed below with respect to an experimental flow set up or standardized testing procedure wherein the inlet is provided as a regular or unconditioned flow, for example, from a hopper or reservoir at standard height or pressure, or from a pump operating at known volumetric pumping characteristics. A flow conditioner 102 of the present invention is sandwiched between flanges in the straight system defined by inlet conduit 101 and downstream conduit 103, and a measurement system 105 is attached about the conduit 103.

Figure 2A:
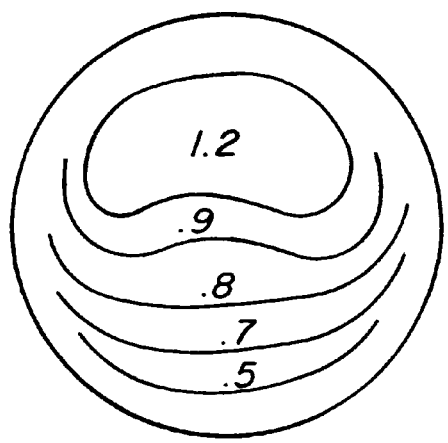
FIG. 2A illustrates a flow irregularity produced by the system of FIG. 2.

As shown schematically in sectional view, FIG. 2A, the flow conditioner of the present invention introduces a controlled irregularity of flow as the fluid passes there through. The pattern shown in FIG. 2A has a marked asymmetry of flow profile with a higher flow velocity along one side of the pipe than on the other. As further shown in FIG. 2, the inlet and downstream conduits have a diameter D, and the measurement system 105 is positioned downstream of the flow conditioner at a distance L. By way of example, length L may typically be on the order of 0.5 to 5D, and preferably about one to three diameters downstream. It will be understood that the illustrated flow profile of FIG. 2A is not a steady or fully developed profile, but generally if allowed to flow along the circular conduit 103 for a substantial distance, will evolve toward a more symmetric and/or stationary distribution. Significantly, however, the evolution of this conditioned irregularity will for many flows be a smooth and relatively well-behaved or slow evolution, so that the location of the transducers of system 105 may be selected to operate in a length near the flow condition 102 which has a known profile or flow irregularity.

In accordance with a principal aspect of this invention, the flow conditioner 102 is preferably implemented as an aperture plate, having a pattern of differently sized and located apertures effective to introduce the flow irregularity of a pipe junction. Thus, for example, while the aperture plate 102 is simply a thin member placed across the flow, its apertures are configured to introduce the disturbance normally created by an elbow, or are configured to simulate the disturbance of a T, or of a succession of offset elbows that cause swirl in the fluid leaving the inlet conduit 101. Thus, the plate acts as a bend or junction simulator.

Figure 3:
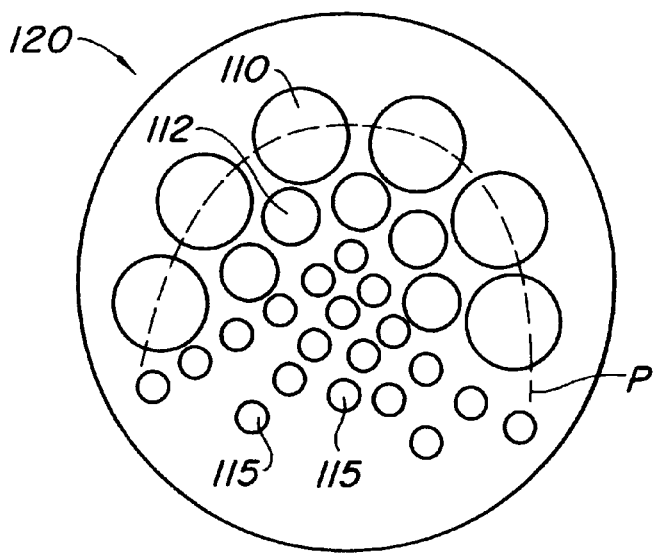
FIG. 3 illustrates a representative swirl plate in accordance with the present invention.

FIG. 3 illustrates schematically a single plate 120 having an aperture pattern for simulating the flow profile introduced by an elbow in a flow conduit. As shown, the plate 120 has a pattern of apertures including a number of primary apertures 110 of relatively large diameter arranged along a contour or region P selectively located within the cross-sectional area, to determine the general cross-sectional region of the conduit where the primary flow is to occur. Plate 120 further includes a plurality of small holes 115 extending in an otherwise aperture free region to relieve pressure build up and prevent cavitation in the area of most restricted flow. The relief apertures 115 extend along one or more curves to generally cover a substantial portion of that region of the conduit. By way of example, in a five centimeter diameter conduit, the relief apertures 115 may have a diameter of one or two millimeters, while the primary apertures 110 may have a diameter of one-half to one centimeter. Located generally between the primary apertures and the relief apertures are a third plurality of apertures 112 of intermediate size, which provide a contiguous region of intermediate flow velocity next to the primary flow. By placing the primary holes 110 next to each other over a relatively large band, the high flow passed by these apertures is made to interact with the flow of adjacent apertures in a manner which counteracts turbulence and allows the smooth formation of relatively large, graded flow regions similar to those shown in FIG. 2A, thus introducing the form of flow and profile characteristic of an elbow.

In general, the exact arrangement of apertures will be different for different diameter conduits, different fluid density, viscosity and flow rates. Thus to create the plate for a given set of conduits—e.g. alcohol at 5–50 m/sec. in a 20 centimeter conduit, the precise size and location of the apertures of each kind 110, 112, 115 may be adjusted based upon detailed measurements to achieve the simulation of the disturbance introduced by a standard elbow in the given size conduit. For this purpose applicant envisages an experimental set up which may include an array of pitot tubes or other point-sensing pressure or flow sensors located at variable locations along the length L to determine the exact profile introduced by the plate, and preferably moves the array axially to map the profile change over the length 2L. The configuration of the aperture plate 120 may then be modified to increase or decrease flow in a particular region, or to stabilize the achieved flow profile so that the plate dependably simulates the desired flow disturbance and may be routinely used to calibrate a metering system. Similarly, as the profile (FIG. 2A) evolves along the length of the conduit 103, the length L (FIG. 2) may be selected so as to achieve the exact desired profile, within a known tolerance of its upstream and downstream changes along the sensing path, of the system 105.

In accordance with a further aspect of the invention, the aperture plate 120 may be configured to introduce a flow disturbance such as a precisely quantified swirl disturbance. For example the plate 120 may be configured to introduce the swirl distribution typically caused by a pair of successive elbows located in different planes upstream of the flow measurement segment 103.

Figure 4A:
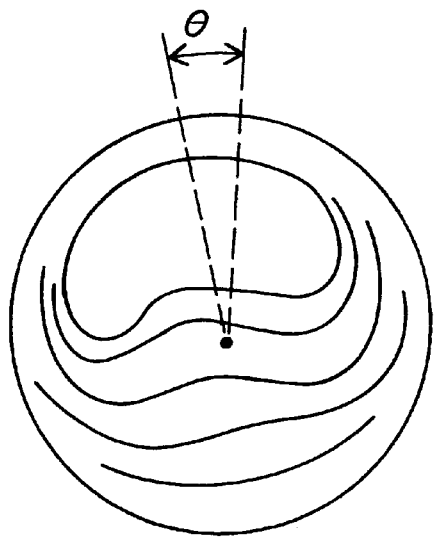
FIGS. 4A, 4B illustrates swirl irregularities of the invention.
Figure 4B:
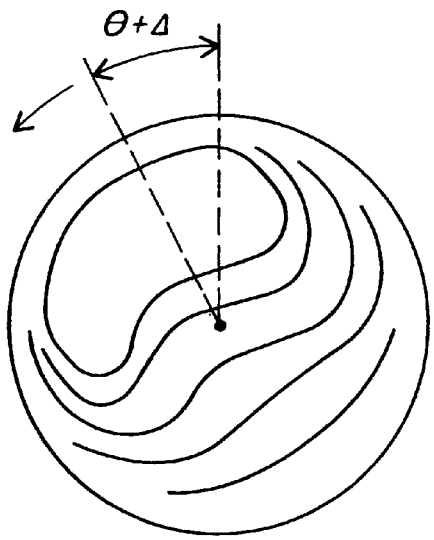

The presence of swirl is best depicted by use of two successive sections taken through the pipe flow segment as shown in FIGS. 4A, 4B. As indicated therein in a simple form, swirl involves a twisting of the flow paths as the fluid travels. When the profile is asymmetric, two successive slices show the flow profile progressively offset by an angle along the direction of flow. It will be understood that the profile itself will be evolving along the length of conduit, and this change may also be modeled or incorporated as a set of corrections in the flow measurement processing.

For introducing a swirl disturbance, the present invention contemplates several different forms of swirl plate assembly. A first embodiment of such an assembly may comprise two swirl plates separated by a short distance, for example less than one half a pipe diameter, with the plates rotated with respect to each other so that the principal flow is forced to assume a slight twist or offset as it passes from the first plate through the second plate. In a second embodiment, swirl may be introduced by using a relatively thick plate 120, for example a plate one centimeter thick, and by having one or more of the sets of major apertures 110, 112 drilled at a helix angle through the plate so as to introduce a twisting of the fluid flow as it passes therethrough. In still a third embodiment, applicant contemplates introducing swirl into the flow passing through the aperture plate by positioning sets of apertures to create effective swirl producing pressure gradients within the resulting flow profile. For example rather than employing a set of uniformly large holes 110 spaced about an arc P (FIG. 3), the primary apertures 110 may form a sequence of graded size such that the flow passed the holes at one end of the arc is naturally urged circumferentially toward the region of lower flow or pressure passed by holes nearer the other end of the arc, due to a mechanism such as pressure differential or a velocity-dependent viscous drag, compressibility or other property of the fluid. Another swirl-introducing configuration would be to have a spiral array of primary holes. In each case the actual swirl profile introduced would then be measured and adjusted against the known profile introduced by an elbow, T or other plumbing configuration, and the apertures modified accordingly to tune the exact disturbance and properly simulate the junction. However, once the aperture plate has correctly simulated the junction it may then be routinely bolted into the straight experimental conduit segment 103, and measurements may then be taken at length L downstream to test, calibrate or design the measurement system 105 for routine attachment for measuring the corresponding unconditioned disturbance in an actual plant.

Thus, the invention contemplates the use of one or more plates to create a standard disturbance which accurately models the flow condition downstream of a bent or joined conduit in a plant. The disturbance may be created by a single plate, a thick plate or a plurality of plates, and in general once calibrated the plate may be routinely substituted in a uniform flow conduit of the same size to introduce a defined irregularity for calibration of diverse flow instruments under known conditions of flow profile or swirl.

In accordance with a further aspect of the invention a method of measuring flow involves the step of preparing a calibration flow line with a plate that introduces a disturbance corresponding to a conduit bend or fitting. A flow meter is then operated under defined flow rate conditions (e.g., while providind a known flow, or while recording the weight of the output of the line) to make measurements in the disturbed flow downstream of the disturbance plate, and the measurements so made are stored in a microprocessor. The system with a table of the stored calibrations is then installed in a plant line having the actual bend or fitting corresponding to the disturbance, and measurements made in the plant conduit are corrected in accordance with the stored table.

The invention being thus disclosed and described, further variations and modifications will occur to those skilled in the art. Thus, for example the disturbance plate may be configured to shed vortices and introduce a disturbance like that found downstream of a vortex meter. Alternatively, the plate may be configured to introduce a disturbance of a turbine meter or other plant equipment located in the flow line. All such variations and modifications are considered to lie within the scope of the invention as defined by the claims appended hereto and equivalents thereof.

What is claimed is:

1. A flow conditioning plate for interposition in a flow line to condition flow of fluid in the flow line, wherein the plate has a pattern of apertures effective to introduce a defined conduit flow irregularity that simulates an irregular flow characteristic of a conduit configuration, whereby interposition of the flow conditioning plate in a fluid path simulates flow in a conduit having said configuration.

2. A flow conditioning plate according to claim 1, wherein the pattern of apertures introduces a defined irregularity corresponding to an upstream conduit fitting or bend.

3. A flow conditioning plate according to claim 1, wherein the pattern of apertures introduces an asymmetric profile.

4. A flow conditioning plate according to claim 3, wherein the asymmetric profile is a profile characteristic of an upstream elbow or fitting.

5. A flow conditioning plate according to claim 1, wherein the pattern of apertures introduces a defined swirl.

6. A flow conditioning plate according to claim 5, wherein the swirl is characteristic of plural upstream fittings.

7. A flow conditioning plate according to claim 1, wherein the pattern is characteristic of plural upstream fittings.

8. A flow conditioning plate for interposition in a flow line to condition flow of fluid in the flow line, wherein the plate has a pattern of apertures effective to introduce a distribution of flow across the cross-section of the conduit, wherein the distribution is a flow irregularity which persists for a well defined distance along the flow path and simulates an irregular flow condition characteristic of a conduit configuration present in a plant, thereby allowing ultrasonic flow meter testing or calibration in the flow line to adapt a meter for use in the plant.

9. A method of calibrating a flow meter for field use to measure unsettled flow in a conduit of a plant, such method comprising the steps of mounting a flow conditioning plate in a flow line, wherein the plate has a pattern of apertures effective to introduce a flow distribution along the flow line which simulates an irregular flow of a conduit having a configuration, and performing flow measurements with an ultrasonic flow meter downstream of the plate in the flow line under known flow conditions, thereby calibrating the meter for measuring the flow in a plant conduit having said configuration.

10. The method of claim 9, wherein the step of performing flow measurements includes determining a meter factor.

11. The method of claim 9, wherein the step of performing flow measurements includes compiling a table relating the measurements to the known flow conditions.

* * * * *